United States Patent
Chaudhary et al.

(10) Patent No.: US 10,487,200 B2
(45) Date of Patent: Nov. 26, 2019

(54) CROSSLINKABLE POLYMERIC COMPOSITIONS FOR FLEXIBLE CROSSLINKED CABLE INSULATION AND METHODS FOR MAKING FLEXIBLE CROSSLINKED CABLE INSULATION

(71) Applicant: Dow Global Technologies LLC, Midland, MI (US)

(72) Inventors: Bharat I. Chaudhary, Princeton, NJ (US); Rennisha Wickham, Pearland, TX (US); Morgan M. Hughes, Angleton, TX (US); Juan C. Tuberquia, Manvel, TX (US)

(73) Assignee: Dow Global Technologies LLC, Midland, MI (US)

( * ) Notice: Subject to any disclaimer, the term of this patent is extended or adjusted under 35 U.S.C. 154(b) by 17 days.

(21) Appl. No.: 15/770,392

(22) PCT Filed: Oct. 13, 2016

(86) PCT No.: PCT/US2016/056719
§ 371 (c)(1),
(2) Date: Apr. 23, 2018

(87) PCT Pub. No.: WO2017/074707
PCT Pub. Date: May 4, 2017

(65) Prior Publication Data
US 2018/0305533 A1   Oct. 25, 2018

Related U.S. Application Data

(60) Provisional application No. 62/247,806, filed on Oct. 29, 2015.

(51) Int. Cl.
| | | |
|---|---|---|
| *C08L 23/04* | (2006.01) | |
| *C08L 23/08* | (2006.01) | |
| *C08L 23/06* | (2006.01) | |
| *C08L 23/16* | (2006.01) | |
| *C08K 3/34* | (2006.01) | |
| *C08K 5/14* | (2006.01) | |
| *H01B 3/30* | (2006.01) | |

(52) U.S. Cl.
CPC .......... *C08L 23/0815* (2013.01); *C08K 3/346* (2013.01); *C08K 5/14* (2013.01); *C08L 23/04* (2013.01); *C08L 23/06* (2013.01); *C08L 23/16* (2013.01); *H01B 3/307* (2013.01); *C08L 2203/206* (2013.01); *C08L 2205/02* (2013.01); *C08L 2207/066* (2013.01); *C08L 2312/00* (2013.01)

(58) Field of Classification Search
CPC ...... C08L 23/04; C08L 23/0815; C08L 23/16; C08L 23/06; C08L 2207/066; C08L 2312/00; C08L 2205/02; C08L 2203/206; B01B 3/307; C08K 5/14; C08K 3/346
See application file for complete search history.

(56) References Cited

U.S. PATENT DOCUMENTS

| | | |
|---|---|---|
| 3,645,992 A | 2/1972 | Elston |
| 4,018,852 A | 4/1977 | Schober |
| 4,076,698 A | 2/1978 | Anderson et al. |
| 4,544,762 A | 10/1985 | Kaminsky et al. |
| 4,857,600 A | 8/1989 | Gross et al. |
| 5,015,749 A | 5/1991 | Schmidt et al. |
| 5,041,584 A | 8/1991 | Crapo et al. |
| 5,041,585 A | 8/1991 | Deavenport et al. |
| 5,246,783 A | 9/1993 | Spenadel et al. |
| 5,266,627 A | 11/1993 | Meverden et al. |

(Continued)

FOREIGN PATENT DOCUMENTS

| | | |
|---|---|---|
| WO | 200238628 A2 | 5/2002 |
| WO | 200340195 | 5/2003 |

(Continued)

OTHER PUBLICATIONS

"Vistalon 1703P EPDM for a New Generation of Medium Voltage Cable Insulation," 2000, ExxonMobil Chemical.
Otocka, E. P., "Distribution of Long and Short Branches in Low-Density Polyethylenes," Macromolecules, p. 507-512, v. 4, No. 4.
Scholte, TH. G., et. al., "Mark-Houwink Equation and GPC Calibration for Linear Short-Chain Branched Polyolefins, Including Polypropylene and Ethylene-Propylene Copolymers,"Journal of Applied Polymer Science, 1984, p. 3763-3782, v. 29.
Ehsani, Morteza, et. al., "LDPE/EPDM Blends as Electrical Insulators with Unique Surface, Electrical and Mechanical Properties," Iranian Polymer Journal, 2009, p. 37-37, v. 18, No. 1.

(Continued)

*Primary Examiner* — Nathan M Nutter

(57) ABSTRACT

Crosslinkable polymeric compositions comprising: (a) a polymer blend comprising: (1) 10 to 94 weight percent, based on the total weight of the crosslinkable polymeric composition, of an ethylene-based interpolymer having the following properties: (i) a density of 0.93 g/cm$^3$ or less, (ii) a melt index (I$_2$) at 190° C. of greater than 0.2 g/10 minutes, and (iii) a shear thinning ratio (V0.1/V100) at 190° C. and 10% strain of less than 8; and (2) 5 to 90 weight percent, based on the total weight of the crosslinkable polymeric composition, of a high-pressure polyethylene; and (b) 0 to less than 40 weight percent, based on the total weight of the crosslinkable polymeric composition, of a filler, where the ethylene-based interpolymer of component (a) is not prepared in a high-pressure reactor or process. Additionally, the polymer blend has the following properties: (i) a shear thinning ratio (V0.1/V100) at 190° C. and 10% strain of at least 5, (ii) a high-shear viscosity (V100) at 190 C and 10% strain of less than 1,300 Pa·s, (iii) a melt strength of at least 4 centiNewtons at 190° C., and (iv) a flexural modulus, 2% secant, of less than 25,000 psi. Such crosslinkable polymeric compositions may be employed as insulation layers in flexible power cables.

10 Claims, No Drawings

(56) References Cited

U.S. PATENT DOCUMENTS

| | | |
|---|---|---|
| 5,346,961 A | 9/1994 | Shaw et al. |
| 5,542,199 A | 8/1996 | Dreisbach et al. |
| 5,575,965 A | 11/1996 | Caronia et al. |
| 5,977,251 A | 11/1999 | Kao et al. |
| 6,103,657 A | 8/2000 | Murray |
| 6,319,989 B1 | 11/2001 | Anderson et al. |
| 6,320,005 B1 | 11/2001 | Murray |
| 6,496,629 B2 | 12/2002 | Ma et al. |
| 6,545,088 B1 | 4/2003 | Kolthammer et al. |
| 6,683,149 B2 | 1/2004 | Jain et al. |
| 6,714,707 B2 | 3/2004 | Rossi et al. |
| 2004/0220050 A1 | 11/2004 | Frazier et al. |
| 2006/0177675 A1 | 8/2006 | Lehtinen et al. |
| 2011/0136982 A1 | 6/2011 | Tse et al. |
| 2012/0130019 A1* | 5/2012 | Karjala et al. ........ C08F 210/16 525/240 |
| 2014/0179873 A1 | 6/2014 | Lam et al. |
| 2018/0312662 A1* | 11/2018 | Chaudhary et al. ... H01B 3/441 |

FOREIGN PATENT DOCUMENTS

| | | |
|---|---|---|
| WO | 2006045501 | 5/2006 |
| WO | 2007136494 A2 | 11/2007 |
| WO | 2007136495 A2 | 11/2007 |
| WO | 2007136496 A2 | 11/2007 |
| WO | 2007136497 A2 | 11/2007 |
| WO | 2011002998 | 1/2011 |
| WO | 2012112259 A2 | 8/2012 |
| WO | 2013096573 | 6/2013 |
| WO | 2014084892 | 6/2014 |
| WO | 2014084893 | 6/2014 |

OTHER PUBLICATIONS

Ke, Qing Quan, et. al., "Thermal, Mechanical, and Dielectric Behaviors of Crosslinked Linear Low density Polyethylene/ Polyolefin Elastomers Blends," Journal of Applied Polymer Science, 2007, p. 1920-1927, v. 104.

Palys, Leonard, et. al., "Improved Processability and Productivity of Wire & Cable Compounds Using SP2 Scorch Protected Organic Peroxides," International Wire & Cable Symposium—Proceedings of the 56th IWCS, 2007, p. 594-601.

* cited by examiner

CROSSLINKABLE POLYMERIC COMPOSITIONS FOR FLEXIBLE CROSSLINKED CABLE INSULATION AND METHODS FOR MAKING FLEXIBLE CROSSLINKED CABLE INSULATION

REFERENCE TO RELATED APPLICATIONS

The present application claims the benefit of U.S. Provisional Application No. 62/247,806, filed on Oct. 29, 2015.

FIELD

Various embodiments of the present invention relate to crosslinkable polymeric compositions for making flexible crosslinked cable insulation.

INTRODUCTION

The crosslinked insulation layer of flexible power cables is generally made of compounds comprising ethylene/propylene ("EP") or ethylene/propylene/diene monomer ("EPDM") polymers. These EP and EPDM interpolymers typically have a relatively high melt viscosity (e.g., as evidenced by a relatively low melt index, such as an I2 of less than 0.2 g/10 minutes). Such interpolymers require fillers, such as calcined clay, to assure adequate pellet stability and melt strength (or zero shear viscosity or extensional viscosity) for sag resistance during extrusion. However, the high melt viscosity and filler content of these polymers reduces the speed at which they can be extruded during cable manufacturing. Furthermore, the incorporation of filler increases the density of the insulation composition, which not only increases the mass of the fabricated cable but also may result in increased manufacturing cost of the cable. Accordingly, improvements are desired.

SUMMARY

One embodiment is a crosslinkable polymeric composition comprising:
(a) a polymer blend comprising:
(1) 10 to 94 weight percent, based on the total weight of said crosslinkable polymeric composition, of an ethylene-based interpolymer having the following properties:
(i) a density of 0.93 g/cm³ or less,
(ii) a melt index ($I_2$) at 190° C. of greater than 0.2 g/10 minutes, and
(iii) a shear thinning ratio (V0.1/V100) at 190° C. and 10% strain of less than 8; and
(2) 5 to 90 weight percent, based on the total weight of said crosslinkable polymeric composition, of a high-pressure polyethylene; and
(b) 0 to less than 40 weight percent, based on the total weight of said crosslinkable polymeric composition, of a filler,
wherein said ethylene-based interpolymer of component (a) is not prepared in a high-pressure reactor or process,
wherein said polymer blend has the following properties:
(i) a shear thinning ratio (V0.1/V100) at 190° C. and 10% strain of at least 5,
(ii) a high-shear viscosity (V100) at 190° C. and 10% strain of less than 1,300 Pa·s,
(iii) a melt strength of at least 4 centiNewtons at 190° C., and
(iv) a flexural modulus, 2% secant, of less than 25,000 psi.

DETAILED DESCRIPTION

Various embodiments of the present invention concern crosslinkable polymeric compositions comprising an ethylene-based interpolymer and a high-pressure polyethylene. Additional embodiments concern crosslinked polymeric compositions prepared from such crosslinkable polymeric compositions. Further embodiments concern coated conductors incorporating the crosslinkable polymeric compositions.

Crosslinkable Polymeric Composition

As noted above, one component of the crosslinkable polymeric compositions described herein is an ethylene-based interpolymer. As used herein, "ethylene-based" interpolymers are interpolymers prepared from ethylene monomers as the primary (i.e., at least 50 weight percent ("wt %")) monomer component, though one or more other co-monomers are employed. "Polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and quaterpolymers (four different monomer types)).

In an embodiment, the ethylene-based interpolymer can be an ethylene/alpha-olefin ("α olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an α-olefin content of less than 50 wt %, less than 45 wt %, less than 40 wt %, or less than 35 wt % based on the entire interpolymer weight. When an α-olefin is employed, the α-olefin can be a $C_{3-20}$ (i.e., having 3 to 20 carbon atoms) linear, branched or cyclic α-olefin. Examples of $C_{3-20}$ α-olefins include propene, 1 butene, 4-methyl-1-pentene, 1-hexene, 1-octene, 1-decene, 1 dodecene, 1 tetradecene, 1 hexadecene, and 1-octadecene. The α-olefins can also have a cyclic structure such as cyclohexane or cyclopentane, resulting in an α-olefin such as 3 cyclohexyl-1-propene (allyl cyclohexane) and vinyl cyclohexane. Illustrative ethylene/α-olefin interpolymers include ethylene/propylene, ethylene/1-butene, ethylene/1 hexene, ethylene/1-octene, ethylene/propylene/1-octene, ethylene/propylene/1-butene, and ethylene/1-butene/1-octene.

In various embodiments, the ethylene-based interpolymer can further comprise a non-conjugated diene comonomer. Suitable non-conjugated dienes include straight-chain, branched-chain or cyclic hydrocarbon dienes having from 6 to 15 carbon atoms. Examples of suitable non-conjugated dienes include, but are not limited to, straight-chain acyclic dienes, such as 1,4-hexadiene, 1,6-octadiene, 1,7-octadiene, and 1,9-decadiene; branched-chain acyclic dienes, such as 5-methyl-1,4-hexadiene, 3,7-dimethyl-1,6-octadiene, 3,7-dimethyl-1,7-octadiene, and mixed isomers of dihydromyricene and dihydroocinene; single-ring alicyclic dienes, such as 1,3-cyclopentadiene, 1,4-cyclohexadiene, 1,5-cyclooctadiene, and 1,5-cyclododecadiene; and multi-ring alicyclic fused and bridged-ring dienes, such as tetrahydroindene, methyl tetrahydroindene, dicyclopentadiene, and bicyclo-(2,2,1)-hepta-2,5-diene; alkenyl, alkylidene, cycloalkenyl, and cycloalkylidene norbornenes, such as 5-methylene-2-norbornene, 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene ("HD"), 5-ethylidene-2-norbornene ("ENB"), 5-vinylidene-2-norbornene ("VNB"), 5-methylene-2-norbornene ("MNB"), and dicyclopentadiene ("DCPD"). The most especially preferred diene is ENB. When present, the diene content of the ethylene-based interpolymer can be in the range of from 0.1 to 10.0 wt %, from 0.2 to 5.0 wt %, or from 0.3 to 3.0 wt %, based on the entire interpolymer weight.

In an embodiment, the ethylene-based interpolymer can be an ethylene/α-olefin elastomer. In various embodiments, when a diene comonomer is employed, the ethylene-based interpolymer can be an ethylene/α-olefin/diene comonomer interpolymer, such as an ethylene/propylene/diene comonomer interpolymer.

In an embodiment, the ethylene-based interpolymer can be selected from the group consisting of an ethylene/propylene copolymer, an ethylene/1-octene copolymer, an ethylene/propylene/diene comonomer terpolymer, and combinations of two or more thereof. In an embodiment, the ethylene-based interpolymer is an ethylene/1-octene copolymer.

When the ethylene-based interpolymer is an ethylene/propylene copolymer, the ethylene can be present in the copolymer in an amount ranging from 50.0 to 98.0 wt %, and the propylene can be present in an amount ranging from 2.0 to 50.0 wt %, based on the entire interpolymer weight. When the ethylene-based interpolymer is an ethylene/1-octene copolymer, the ethylene can be present in the copolymer in an amount ranging from 50.0 to 95.0 wt %, and the 1-octene can be present in an amount ranging from 5.0 to 50.0 wt %, based on the entire interpolymer weight. When the ethylene-based interpolymer is an ethylene/propylene/diene comonomer terpolymer, the ethylene can be present in the copolymer in an amount ranging from 50.0 to 97.9 wt %, the propylene can be present in an amount ranging from 2.0 to 49.9 wt %, and the diene comonomer can be present in an amount ranging from 0.1 to 10 wt %, based on the entire interpolymer weight.

Ethylene-based interpolymers suitable for use herein have a density of 0.93 g/cm$^3$ or less, 0.92 g/cm$^3$ or less, 0.91 g/cm$^3$ or less, 0.90 g/cm$^3$ or less, or 0.89 g/cm$^3$ or less. Additionally, ethylene-based interpolymers suitable for use herein can have a density of at least 0.85 g/cm$^3$, at least 0.86 g/cm$^3$, at least 0.87 g/cm$^3$, or at least 0.88 g/cm$^3$. Polymer densities provided herein are determined according to ASTM International ("ASTM") method D792.

Ethylene-based interpolymers suitable for use herein can have a high-shear viscosity (V100) at 100 s$^{-1}$, 190° C. and 10% strain of 2,000 Pa·s or less, less than 1,600 Pa·s, less than 1,200 Pa·s, less than 1,100 Pa·s, or less than 1,000 Pa·s. Additionally, ethylene-based interpolymers suitable for use herein can have a high-shear viscosity of at least 200 Pa·s under the same conditions. High-shear viscosity is determined according to the procedure provided in the Test Methods section, below.

Ethylene-based interpolymers suitable for use herein can have a shear thinning ratio (V0.1/V100) at 190° C. and 10% strain of less than 8, less than 7, less than 6, less than 5, or less than 4. Additionally, ethylene-based interpolymers suitable for use herein can have a shear thinning ratio of at least 0.1, at least 1, or at least 2. Shear thinning ratio is determined according to the procedure provided in the Test Methods section, below.

In an embodiment, the ethylene-based interpolymer can have a melt index ($I_2$) of greater than 0.2 g/10 min., at least 0.3 g/10 min., at least 0.5 g/10 min., at least 0.7 g/10 min., at least 1.0 g/10 min., at least 1.5 g/10 min., at least 2.0 g/10 min., or at least 2.5 g/10 min. In this embodiment, the ethylene-based interpolymer can have a melt index ($I_2$) of less than 10 g/10 min., less than 7 g/10 min., or less than 5 g/10 min. In various embodiments, the ethylene-based interpolymer can have a melt index ($I_2$) in the range of from 2.0 to 5.0 g/10 min. Melt indices provided herein are determined according to ASTM method D1238. Unless otherwise noted, melt indices are determined at 190° C. and 2.16 Kg (i.e., $I_2$).

Ethylene-based interpolymers suitable for use herein can have a polydispersity index ("PDI," or the ratio of weight-averaged molecular weight (Mw) to number-averaged molecular weight (Mn)) in the range of from 1 to 10, from 2 to 5, or from 2.0 to 4.3. PDI is determined by gel permeation chromatography according to the procedure provided in the Test Methods section, below.

Ethylene-based interpolymers suitable for use herein can have a melt strength at 190° C. in the range of from 0.1 to 20 centiNewtons ("cN"), from 0.5 to 10 cN, or from 0.7 to 5 cN. Melt strength is determined according to the procedure provided in the Test Methods section, below.

In one or more embodiments, the ethylene-based interpolymer is not prepared in a high-pressure reactor or process. As used herein, the term "high-pressure reactor" or "high-pressure process" is any reactor or process operated at a pressure of at least 5000 psi. As known to those of ordinary skill in the art, polyethylenes prepared in a high-pressure reactor or process tend to have a highly branched polymer structure, with branches found both on the polymer backbone and on the branches themselves. In contrast, the ethylene-based interpolymer described herein can be a substantially linear polymer. As used herein, the term "substantially linear" denotes a polymer having a backbone that is substituted with 0.01 to 3 long-chain branches per 1,000 carbon atoms. In some embodiments, the ethylene-based interpolymer can have a backbone that is substituted with 0.01 to 1 long-chain branches per 1,000 carbon atoms, or from 0.05 to 1 long-chain branches per 1,000 carbon atoms.

Long-chain branching is defined herein as a chain length of at least 6 carbon atoms, above which the length cannot be distinguished by $^{13}$C nuclear magnetic resonance ("$^{13}$C NMR") spectroscopy. Long-chain branches can have a length up to about the same length as the polymer backbone. Long-chain branching is determined by $^{13}$C NMR spectroscopy and is quantified using the method of Randall (*Rev. Macromol. Chem. Phys.*, C29 (2&3), p. 285-297), the disclosure of which is incorporated herein by reference.

In an embodiment, the ethylene-based interpolymers can be polymers known as linear olefin polymers which have no long-chain branching. That is, a "linear olefin polymer" has an absence of long-chain branching, as for example the traditional linear-low-density polyethylene or linear-high-density polyethylene polymers or ethylene propylene or EPDM made using Ziegler polymerization processes (e.g., as taught in U.S. Pat. Nos. 4,076,698 and 3,645,992).

Suitable processes useful in producing the ethylene-based interpolymers, including the use of use of multiple loop reactors operating in series and a variety of suitable operating conditions for use therewith, may be found, for example, in U.S. Pat. Nos. 5,977,251, 6,545,088, 6,319,989, and 6,683,149. In particular, the polymerization is carried out as a continuous polymerization, preferably a continuous solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals so that, over time, the overall process is substantially continuous. Due to the difference in monomers, temperatures, pressures or other differences in polymerization conditions between at least two of the reactors or zones connected in series, polymer segments of differing composition such as comonomer content, crystallinity, density, tacticity, regio-regularity, or other chemical or physical difference within the same molecule are formed in the different reactors or zones.

Each reactor in the series can be operated under solution, slurry, or gas-phase polymerization conditions. In a multiple-zone polymerization, all zones operate under the same type of polymerization, such as solution, slurry, or gas phase, but at different process conditions. For a solution polymerization process, it is desirable to employ homogeneous dispersions of the catalyst components in a liquid diluent in which the polymer is soluble under the polymerization conditions employed. One such process utilizing an extremely fine silica or similar dispersing agent to produce such a homogeneous catalyst dispersion wherein normally either the metal complex or the cocatalyst is only poorly soluble is disclosed in U.S. Pat. No. 5,783,512. A slurry process typically uses an inert hydrocarbon diluent and temperatures of from 0° C. up to a temperature just below the temperature at which the resulting polymer becomes substantially soluble in the inert polymerization medium. Preferred temperatures in a slurry polymerization are from 30° C., preferably from 60° C. up to 115° C., preferably up to 100° C. Pressures typically range from atmospheric (100 kPa) to 500 psi (3.4 MPa). In an embodiment, the ethylene-based interpolymer is prepared using solution polymerization.

In all of the foregoing processes, continuous or substantially continuous polymerization conditions can be employed. The use of such polymerization conditions, especially continuous, solution polymerization processes, allows the use of elevated reactor temperatures which results in economical production and efficiencies.

The catalyst may be prepared as a homogeneous composition by addition of the requisite metal complex or multiple complexes to a solvent in which the polymerization will be conducted or in a diluent compatible with the ultimate reaction mixture. The desired cocatalyst or activator and may be combined with the catalyst composition either prior to, simultaneously with, or after combination of the catalyst with the monomers to be polymerized and any additional reaction diluent.

At all times, the individual ingredients as well as any active catalyst composition must be protected from oxygen, moisture and other catalyst poisons. Therefore, the catalyst components, shuttling agent and activated catalysts must be prepared and stored in an oxygen- and moisture-free atmosphere, preferably under a dry, inert gas such as nitrogen.

An exemplary polymerization process for producing the ethylene-based interpolymer is as follows. In one or more well stirred tank or loop reactors operating under solution polymerization conditions, the monomers to be polymerized are introduced continuously together with any solvent or diluent at one part of the reactor. The reactor contains a relatively homogeneous liquid phase composed substantially of monomers together with any solvent or diluent and dissolved polymer. Preferred solvents include $C_{4-10}$ hydrocarbons or mixtures thereof, especially alkanes such as hexane or mixtures of alkanes, as well as one or more of the monomers employed in the polymerization.

Catalyst and cocatalyst are continuously or intermittently introduced in the reactor liquid phase or any recycled portion thereof at a minimum of one location. The reactor temperature and pressure may be controlled by adjusting the solvent/monomer ratio, the catalyst addition rate, as well as by use of cooling or heating coils, jackets or both. The polymerization rate is controlled by the rate of catalyst addition. The content of a given monomer in the polymer product is influenced by the ratio of monomers in the reactor, which is controlled by manipulating the respective feed rates of these components to the reactor. The polymer product molecular weight is controlled, optionally, by controlling other polymerization variables such as the temperature, monomer concentration, or a chain-terminating agent such as hydrogen, as is well known in the art. Connected to the discharge of the reactor, optionally by means of a conduit or other transfer means, is a second reactor, such that the reaction mixture prepared in the first reactor is discharged to the second reactor without substantial termination of polymer growth. Between the first and second reactors, a differential in at least one process condition is established. Preferably for use in formation of an interpolymer of two or more monomers, the difference is the presence or absence of one or more comonomers or a difference in comonomer concentration. Additional reactors, each arranged in a manner similar to the second reactor in the series may be provided as well. Upon exiting the last reactor of the series, the effluent is contacted with a catalyst kill agent such as water, steam, or an alcohol or with a coupling agent.

The resulting polymer product is recovered by flashing off volatile components of the reaction mixture such as residual monomers or diluent at reduced pressure, and, if necessary, conducting further devolatilization in equipment such as a devolatilizing extruder. In a continuous process, the mean residence time of the catalyst and polymer in the reactor generally is from 5 minutes to 8 hours, or from 10 minutes to 6 hours.

Alternatively, the foregoing polymerization may be carried out in a plug flow reactor with a monomer, catalyst, shuttling agent, temperature or other gradient established between differing zones or regions thereof, optionally accompanied by separated addition of catalysts and/or chain shuttling agent, and operating under adiabatic or non-adiabatic polymerization conditions.

The catalyst employed in preparing the ethylene-based interpolymer can be selected from those described in U.S. Pat. No. 8,202,953 B2 from column 10, line 32, to column 18, line 53, which is incorporated herein by reference. In an embodiment, the catalyst employed in preparing the ethylene-based interpolymer can be bis(2-oxoyl-3-(dibenzo-1H-pyrrole-1-yl)-5-(methyl)phenyl)-(4-(2-methyl)propane-2-yl)-2-phenoxy)-1,3-propanediyl zirconium (IV) dichloride, which has the following structure:

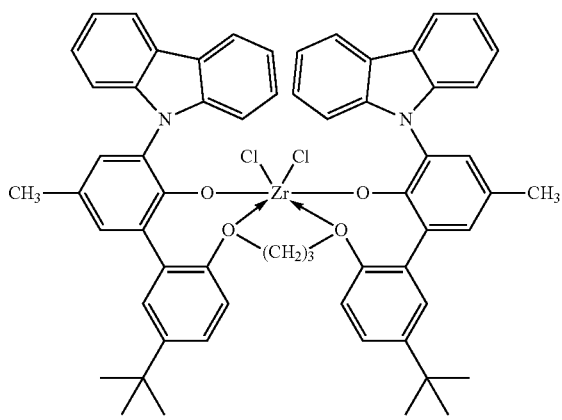

The catalyst may be conveniently prepared by standard metallation and ligand exchange procedures involving a source of the transition metal and a neutral polyfunctional ligand source. In addition, the catalyst may also be prepared by means of an amide elimination and hydrocarbylation process starting from the corresponding transition metal tetraamide and a hydrocarbylating agent, such as trimethylaluminum. The techniques employed are the same as or analogous to those disclosed in U.S. Pat. Nos. 6,320,005 and 6,103,657; PCT Published Patent Application Nos. WO 02/38628 and WO 03/40195; U.S. Published Patent Application No. 2004/0220050, and elsewhere.

The polymerization catalyst may be activated to form an active catalyst composition by combination with one or more cocatalysts, preferably a cation-forming cocatalyst, a strong Lewis acid, or a combination thereof. Suitable cocatalysts for use include polymeric or oligomeric aluminoxanes, especially methyl aluminoxane, as well as inert compatible, noncoordinating ion-forming compounds. So-called modified methyl aluminoxane ("MMAO") or triethyl aluminum ("TEA") are also suitable for use as cocatalysts. One technique for preparing such modified aluminoxane is disclosed in U.S. Pat. No. 5,041,584 (Crapo et al.). Aluminoxanes can also be made as disclosed in U.S. Pat. No. 5,542,199 (Lai et al.); U.S. Pat. No. 4,544,762 (Kaminsky et al.); U.S. Pat. No. 5,015,749 (Schmidt et al.); and U.S. Pat. No. 5,041,585 (Deavenport et al.).

The ethylene-based interpolymer can be present in the crosslinkable polymeric composition in an amount ranging from 10 to 94 wt %, from 20 to 94 wt %, from 30 to 94 wt %, from 40 to 94 wt %, from 50 to 94 wt %, from 60 to 94 wt %, from 70 to 94 wt %, from 80 to 94 wt %, or from 90 to 94 wt %, based on the entire weight of the crosslinkable polymeric composition.

As noted above, the crosslinkable polymeric composition further comprises a polyethylene prepared by a high-pressure process or reactor, such as a high-pressure low-density polyethylene ("HP LDPE"). High-pressure polyethylenes suitable for use herein can have a melt strength at 190° C. of greater than 4 cN, at least 6 cN, or at least 8 cN. Additionally, high-pressure polyethylenes suitable for use can have a melt strength at 190° C. in the range of from 4 to 30 cN, from 6 to 20 cN, or from 8 to 15 cN.

High-pressure polyethylenes are prepared by high-pressure processes that are typically free-radical-initiated polymerizations and conducted in a tubular reactor or a stirred autoclave or a combination of the two. In a tubular reactor, the pressure can be in the range of from 25,000 to 45,000 pounds per square inch (psi), and the temperature can be in the range of from 200 to 350° C. In a stirred autoclave, the pressure can be in the range of from 10,000 to 30,000 psi, and the temperature can be in the range of from 175 to 250° C.

High-pressure polyethylenes include interpolymers comprised of ethylene, unsaturated esters and/or hydrolyzable silane monomers that are well known and can be prepared by conventional high-pressure processes or post-reactor modification. In various embodiments, the unsaturated esters can be alkyl acrylates, alkyl methacrylates, or vinyl carboxylates. The alkyl groups can have from 1 to 8 carbon atoms, or from 1 to 4 carbon atoms. The carboxylate groups can have from 2 to 8 carbon atoms, or from 2 to 5 carbon atoms.

Examples of acrylates and methacrylates include, but are not limited to, ethyl acrylate, methyl acrylate, methyl methacrylate, t-butyl acrylate, n-butyl acrylate, n-butyl methacrylate, and 2-ethylhexyl acrylate. Examples of vinyl carboxylates include, but are not limited to, vinyl acetate, vinyl propionate, and vinyl butanoate.

Such high-pressure polyethylenes generally have a density ranging from about 0.91 to about 0.94 g/cm$^3$. In various embodiments, the high-pressure polyethylene is a high-pressure LDPE having a density of at least 0.915 g/cm$^3$, but less than 0.94 g/cm$^3$, or less than 0.93 g/cm$^3$. HP LDPEs suitable for use herein can have a melt index ($I_2$) of less than 20 g/10 min., or ranging from 0.1 to 10 g/10 min., from 0.2 to 8 g/10 min., from 0.3 to 5 g/10 min, or from 0.4 to 3 g/10 min. Additionally, such HP LDPEs generally have a broad molecular weight distribution resulting in a high polydispersity index. The high-pressure polyethylene can be present in an amount of greater than 0 but less than 90 wt %, from 5 to less than 70 wt %, from 10 to less than 50 wt %, from 15 to less than 40 wt %, or from 20 to 35 wt %, based on the total weight of the crosslinkable polymeric composition.

Suitable commercially available high-pressure polyethylenes include, but are not limited to, DFDA-1216 NT available from The Dow Chemical Company, BPD2000E available from INEOS Olefins and Polymers Europe, and LDPE 2102TX00 available from SABIC Europe.

In various embodiments, a blend of the ethylene-based interpolymer and high-pressure polyethylene can exhibit surprisingly improved properties. In various embodiments, a blend of the ethylene-based interpolymer and high-pressure polyethylene can exhibit a shear thinning ratio (V0.1/V100) at 190° C. and 10% strain of at least 10% greater, at least 15% greater, at least 20% greater, at least 25% greater, at least 50% greater, at least 75% greater, or at least 100% greater than the shear thinning ratio of the unmodified ethylene-based interpolymer. Additionally, the shear thinning ratio of a blend of the ethylene-based interpolymer and the high-pressure polyethylene can be at least 5, at least 5.5, or at least 6.

In various embodiments, a blend of the ethylene-based interpolymer and high-pressure polyethylene can have a high-shear viscosity (V100) at 190° C. and 10% strain of less than 1,300 Pa·s, less than 1,200 Pa·s, less than 1,100 Pa·s, less than 1,000 Pa·s, or less than 950 Pa·s. In such embodiments, the blend can have a high-shear viscosity under the same conditions of at least 500 Pa·s.

Furthermore, a blend of the ethylene-based interpolymer and high-pressure polyethylene can have a melt strength at 190° C. of at least 4 cN, at least 5 cN, at least 6 cN, at least 7 cN, or at least 8 cN. In such embodiments, the blend can have a melt strength up to 20 cN. Additionally, a blend of the ethylene-based interpolymer and high-pressure polyethylene can exhibit a melt strength at 190° C. of at least 50% greater, at least 100% greater, at least 200% greater, at least 300% greater, at least 400% greater, or at least 500% greater than the melt strength of the unmodified ethylene-based interpolymer. In such embodiments, the blend can exhibit a melt strength up to 1,000% greater than the melt strength of the unmodified ethylene-based interpolymer.

Additionally, a blend of the ethylene-based interpolymer and high-pressure polyethylene can have a melt discharge temperature while being extruded on a 2.5-inch 24:1 L/D extruder using a Maddock screw and 20/40/60/20 mesh screens (at set temperatures of 115.6° C. across all five zones, head and the die) at a screw speed of 100 rpm of less than 190° C., less than 185° C., or less than 180° C. Melt discharge temperatures are determined according to the procedure provided in the Test Methods section, below.

In various embodiments, a blend of the ethylene-based interpolymer and high-pressure polyethylene can have a maximum extensional viscosity of greater than 100,000 psi, greater than 150,000 psi, or greater than 200,000 psi when measured at 135° C. and 1 s$^{-1}$ (at any Hencky strain). In such embodiments, the blend can have a maximum extensional viscosity up to 1,000,000 psi (at any Hencky strain).

In various embodiments, a blend of the ethylene-based interpolymer and high-pressure polyethylene can have a zero shear viscosity at 135° C. of at least 5,000 Pa·s, at least 10,000 Pa·s, or at least 15,000 Pa·s. Additionally, the blend can have a zero shear viscosity at 135° C. of up to 300,000 Pa·s.

In various embodiments, a blend of the ethylene-based interpolymer and high-pressure polyethylene can have a flexural modulus, 2% secant of less than 25,000 psi, less than 20,000 psi, less than 15,000 psi, less than 10,000 psi, or less than 8,000 psi. In such embodiments, the blend can have a flexural modulus, 2% secant under the same conditions of at least 1,000 psi.

In one or more embodiments, blends of the ethylene-based interpolymer and high-pressure polyethylene exhibiting the foregoing properties can comprise the ethylene-based interpolymer in an amount ranging from 60 to 95 wt %, 62 to 90 wt %, from 65 to 85 wt %, or from 65 to 80 wt %, based on the combined weight of the ethylene-based interpolymer and high-pressure polyethylene. Additionally, such blends can comprise the high-pressure polyethylene in an amount ranging from 5 to 40 wt %, 10 to 38 wt %, from 15 to 35 wt %, or from 20 to 35 wt %, based on the combined weight of the ethylene-based interpolymer and high-pressure polyethylene.

As noted above, the polymeric compositions described herein are crosslinkable. The term "crosslinkable" means that the polymeric composition contains one or more additives or modifications that enhance the ethylene-based interpolymer's and high-pressure polyethylene's ability to crosslink when subjected to crosslinking conditions (e.g., heat, irradiation, or moisture). In one or more embodiments, the polymeric composition can be rendered crosslinkable by further comprising an organic peroxide. Organic peroxides suitable for use herein include mono-functional peroxides and di-functional peroxides. As used herein, "mono-functional peroxides" denote peroxides having a single pair of covalently bonded oxygen atoms (e.g., having a structure R—O—O—R). As used herein, "di-functional peroxides" denote peroxides having two pairs of covalently bonded oxygen atoms (e.g., having a structure R—O—O—R—O—O—R). In an embodiment, the organic peroxide is a mono-functional peroxide.

Exemplary organic peroxides include dicumyl peroxide ("DCP"); tert-butyl peroxybenzoate; di-tert-amyl peroxide ("DTAP"); bis(t-butyl-peroxy isopropyl) benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3; 1,1-bis(t-butylperoxy)3,3,5-trimethylcyclohexane; isopropylcumyl cumylperoxide; butyl 4,4-di(tert-butylperoxy)valerate; di(isopropylcumyl) peroxide; and mixtures of two or more thereof. In various embodiments, only a single type of organic peroxide is employed. In an embodiment, the organic peroxide is dicumyl peroxide.

In various embodiments, the organic peroxide can be present in the crosslinkable polymeric composition in an amount of at least 0.5 wt %, or in the range of from 0.5 to 5 wt %, from 0.5 to 3 wt %, from 0.5 to 2.5 wt %, from 1 to 2.5 wt %, or from 1.5 to 2.5 wt %, based on the entire weight of the crosslinkable polymeric composition.

As an alternative, or in addition, to the use of peroxides to render the polymeric composition crosslinkable, other approaches for crosslinking of polymers may be used to effect the desired degree of crosslinking. Such approaches and technologies are well known to those skilled in the art and include (but are not limited to) radiation crosslinking, moisture crosslinking, bisulfonyl azide crosslinking, crosslinking with hydroxyl terminated polydimethylsiloxane, etc. In some cases, it would be necessary for the above-described ethylene-based interpolymer and/or high-pressure polyethylene to be functionalized appropriately to enable crosslinking (for example, with alkoxy silanes in the case of moisture crosslinking or crosslinking with hydroxyl terminated polydimethylsiloxane).

In various embodiments, the ethylene-based interpolymer and/or high-pressure polyethylene may be rendered crosslinkable by functionalization with a hydrolyzable silane group. As known in the art, when in the presence of water, such hydrolyzable silane groups will undergo a hydrolysis reaction to generate Si—O—Si bonds to form a crosslinking network between polymer chains (a.k.a., moisture crosslinking or moisture curing). Functionalization of the ethylene-based interpolymer and/or high-pressure polyethylene can be accomplished by either copolymerizing a monomer having a hydrolyzable silane group with the above-described ethylene and comonomers or by grafting a hydrolyzable silane group to the backbone of the ethylene-based interpolymer in a post-reactor process. Such techniques are within the capabilities of one having ordinary skill in the art.

Hydrolyzable silane monomers suitable for use in forming a silane-functionalized ethylene-based interpolymer and/or high-pressure polyethylene can be any hydrolyzable silane monomer that will effectively copolymerize with an olefin (e.g., ethylene), or graft to and crosslink an olefin (e.g., ethylene) polymer. Those described by the following formula are exemplary:

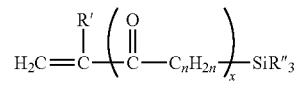

in which R' is a hydrogen atom or methyl group; x is 0 or 1; n is an integer from 1 to 12 inclusive, preferably 1 to 4, and each R" independently is a hydrolyzable organic group such as an alkoxy group having from 1 to 12 carbon atoms (e.g. methoxy, ethoxy, butoxy), an aryloxy group (e.g. phenoxy), an araloxy group (e.g. benzyloxy), an aliphatic acyloxy group having from 1 to 12 carbon atoms (e.g. formyloxy, acetyloxy, propanoyloxy), an amino or substituted amino group (alkylamino, arylamino), or a lower-alkyl group having 1 to 6 carbon atoms inclusive, with the proviso that not more than one of the three R" groups is an alkyl. Such silanes may be copolymerized with ethylene in a reactor, such as a high-pressure process. Such silanes may also be grafted to a suitable ethylene polymer by the use of a suitable quantity of organic peroxide. Suitable silanes include unsaturated silanes that comprise an ethylenically unsaturated hydrocarbyl group, such as a vinyl, allyl, isopropenyl, butenyl, cyclohexenyl or gamma (meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer or copolymerized in-reactor with other monomers (such as ethylene and acrylates). These silanes and their method of preparation are more fully described in U.S. Pat. No. 5,266,627 to Meverden, et al. Suitable hydrolyzable silane monomers include, but are not limited to, vinyltrimethoxysilane ("VTMS"), vinyltriethoxysilane ("VTES"), vinyltriacetoxysilane, and gamma-(meth)acryloxy propyl trimethoxy silane. When included, the silane functional comonomer can constitute in the range of from 0.2 to 10 wt % of the ethylene-based interpolymer.

In one or more embodiments, the crosslinkable polymeric composition may optionally comprise a filler. Fillers suitable for use herein include, but are not limited to, heat-treated clay, surface-treated clay, organo-clay, precipitated silica and silicates, fumed silica, calcium carbonate, ground minerals, aluminum trihydroxide, magnesium hydroxide, and carbon blacks.

In various embodiments, the crosslinkable polymeric composition comprises 0 to less than 40 wt % filler, based on the entire weight of the crosslinkable polymeric composition. Additionally, the crosslinkable polymeric composition can comprise greater than 0 but less than 40 wt %, less than 30 wt %, less than 20 wt %, less than 10 wt %, less than 8 wt %, less than 5 wt %, less than 2 wt %, or less than 1 wt % filler, based on the entire weight of the crosslinkable polymeric composition. In various embodiments, the crosslinkable polymeric composition can be free or substantially free of filler. As used herein with respect to filler content, the term "substantially free" denotes a concentration of less than 10 parts per million by weight, based on the entire weight of the crosslinkable polymeric composition.

The crosslinkable polymeric composition may also contain other additives including, but not limited to, antioxidants, crosslinking agents (e.g., cure boosters or coagents), other polymers beyond those noted above, tree-retardants (e.g., polyethylene glycol, polar polyolefin copolymers, etc.), scorch-retardants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, flame retardants, and metal deactivators. Examples of known crosslinking coagents are triallyl isocyanurate, ethoxylated bisphenol A dimethacrylate, α-methyl styrene dimer (AMSD), and other co-agents described in U.S. Pat. Nos. 5,346,961 and 4,018,852. Additives, other than fillers, are typically used in amounts ranging from 0.01 or less to 10 or more wt % based on total composition weight.

As mentioned above, an antioxidant can be employed with the cross-linkable polymeric composition. Exemplary antioxidants include hindered phenols (e.g., tetrakis [methylene (3,5-di-t-butyl-4-hydroxyhydrocinnamate)] methane); phosphites and phosphonites (e.g., tris (2,4-di-t-butylphenyl) phosphate); thio compounds (e.g., dilaurylthiodipropionate); various siloxanes; and various amines (e.g., polymerized 2,2,4-trimethyl-1,2-dihydroquinoline). Antioxidants can be used in amounts of 0.1 to 5 wt % based on the total weight of the crosslinkable polymeric composition. In the formation of wire and cable compositions, discussed below, antioxidants may be added to the system before processing (i.e., prior to extrusion and crosslinking) of the finished article.

The components of the composition can be blended in any manner and using any equipment. Typically, the polymers are melt blended with one another in conventional mixing equipment, e.g., a BRABENDER™ batch mixer or extruder, to form a relatively homogeneous blend comprising continuous, co-continuous and/or discontinuous phases. The mixing or blending may be done at, below or above the upper melting temperature (point) of the polymers. The peroxide and other additives can be added in any manner, including soaking and mixing. In one embodiment, the peroxide and other additives are blended with one another and then added to one or more of the polymers or polymer blend. In one embodiment the peroxide and other additives are added individually. In one embodiment one or more of the components are mixed with one or more of the polymers before melt-blending with one another. In one embodiment one or more of the peroxide and other additives are added as a masterbatch either to the blended polymers or to one or more of the polymers prior to melt blending. Typically, the peroxide is the last component to be added to one or more of the polymers or polymer blend although here too, it can be first soaked or mixed with one or more of the polymers prior to the melt blending of the polymers. In an embodiment, all the ingredients (including peroxide) are melt-blended in one step. In another embodiment, all the ingredients (including peroxide) are melt-blended in one step as part of the cable extrusion process, without a need to first prepare a compound prior to use during cable extrusion.

For example, compounding can be performed by either (1) compounding all components into the ethylene-based interpolymer, or (2) compounding all the components except for the organic peroxide and other liquid additives, which may be soaked into the ethylene-based interpolymer composition after all others have been incorporated. Compounding can be performed at a temperature of greater than the melting temperature of the ethylene-based interpolymer up to a temperature above which the ethylene-based interpolymer begins to degrade. In various embodiments, compounding can be performed at a temperature ranging from 100 to 200° C., or from 110 to 150° C. In various embodiments, soaking the organic peroxide and/or other liquid additives into the ethylene-based interpolymer or ethylene-based interpolymer composition can be performed at a temperature ranging from 30 to 100° C., from 50 to 90° C., or from 60 to 80° C.

The resulting crosslinkable polymeric composition can have a zero shear viscosity at 135° C. of at least 10,000 Pa·s, at least 20,000 Pa·s, or at least 30,000 Pa·s. Additionally, the crosslinkable polymeric composition can have a zero shear viscosity at 135° C. of up to 400,000 Pa·s. Zero shear viscosity is determined according to the procedure described in the Test Methods section, below.

The crosslinkable polymeric composition can have an extensional viscosity of greater than 200,000 Poise, greater than 225,000 Poise, or greater than 250,000 Poise when measured at 135° C., 1 s$^{-1}$, and a Hencky strain of 1. The crosslinkable polymeric composition can have an extensional viscosity up to 10,000,000 Poise at any Hencky strain. Extensional viscosity is determined according to the procedure described in the Test Methods section, below.

The crosslinkable polymeric composition can have a time for a 1 lb-in. increase in torque ("ts1") at 140° C. of at least 10 minutes, at least 15 minutes, or at least 20 minutes. Additionally, the crosslinkable polymeric composition can have a ts1 of up to 300 minutes. Determination of ts1 is done according to the procedure described in the Test Methods section, below.

Crosslinked Polymeric Composition

The above-described crosslinkable polymeric composition can be cured or allowed to cure in order to form a crosslinked polymeric composition. When a peroxide is employed, such curing can be performed by subjecting the crosslinkable polymeric composition to elevated temperatures in a heated cure zone, which can be maintained at a temperature in the range of 175 to 260° C. The heated cure zone can be heated by pressurized steam or inductively heated by pressurized nitrogen gas. Thereafter, the crosslinked polymeric composition can be cooled (e.g., to ambient temperature).

Following crosslinking, the crosslinked polymeric composition can undergo degassing to remove at least a portion of the volatile decomposition byproducts. Degassing can be performed at a degassing temperature, a degassing pressure, and for a degassing time period to produce a degassed polymeric composition. In various embodiments, the degassing temperature can range from 50 to 150° C., or from 60 to 80° C. In an embodiment, the degassing temperature is 65 to 75° C. Degassing can be conducted under standard atmosphere pressure (i.e., 101,325 Pa).

The extent of crosslinking in the crosslinked polymeric composition can be determined via analysis on a moving die rheometer ("MDR") at 182° C. according to ASTM D5289-12. Upon analysis, an increase in torque, as indicated by the difference between the maximum elastic torque ("MH") and the minimum elastic torque ("ML") ("MH-ML"), indicates greater degree of crosslinking. In various embodiments, the resulting crosslinked polymeric composition can have an MH-ML of at least 0.2 lb-in., at least 0.6 lb-in., at least 1.0 lb-in., at least 1.4 lb-in., at least 1.8 lb-in., at least 2.0 lb-in, at least 2.5 lb-in., at least 3.0 lb-in., or at least 4.0 lb-in. Additionally, the crosslinked polymeric composition can have an MH-ML up to 30 lb-in.

In various embodiments, the crosslinked polymeric composition can have a Shore D hardness of 40 or less, 35 or less, or 30 or less. Additionally, the crosslinked polymeric composition can have a Shore D hardness of at least 10. In one or more embodiments, the crosslinked polymeric composition can have a Shore A hardness of 90 or less, 85 or less, or 80 or less. Additionally, the crosslinked polymeric composition can have a Shore A hardness of at least 60.

In one or more embodiments, the crosslinkable polymeric composition can have a gel content of at least 30 wt %, at least 40 wt %, or at least 50 wt %. Additionally, the crosslinkable polymeric composition can have a gel content up to 99 wt %.

In various embodiments, the crosslinked polymeric composition can have a hot creep of any value, even if not measurable due to insufficient crosslinking for hot creep to be measurable. In other embodiments, the crosslinked polymeric composition can have a hot creep value of 200% or less, 150% or less, 75% or less, 50% or less, or 40% or less.

In one or more embodiments, the crosslinked polymeric composition can have a dissipation factor of less than 8%, less than 4%, less than 1%, or less than 0.7% when measured at 60 Hz, 2 kV, and 130° C.

Coated Conductor

A cable comprising a conductor and an insulation layer can be prepared employing the above-described crosslinkable polymeric composition. The above-described crosslinkable polymeric composition may be used to make one or more layers of the coated conductor (including insulation, semiconductive shield, and jacket). "Cable" and "power cable" mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. Typical cable designs are illustrated in U.S. Pat. Nos. 5,246,783, 6,496,629 and 6,714,707. "Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic.

Such a cable can be prepared with various types of extruders (e.g., single or twin screw types) by extruding the crosslinkable polymeric composition onto the conductor, either directly or onto an interceding layer. A description of a conventional extruder can be found in U.S. Pat. No. 4,857,600. An example of co-extrusion and an extruder therefore can be found in U.S. Pat. No. 5,575,965.

Following extrusion, the extruded cable can pass into a heated cure zone downstream of the extrusion die to aid in crosslinking the crosslinkable polymeric composition and thereby produce a crosslinked polymeric composition. The heated cure zone can be maintained at a temperature in the range of 175 to 260° C. In an embodiment, the heated cure zone is a continuous vulcanization ("CV") tube. In various embodiments, the crosslinked polymeric composition can then be cooled and degassed, as discussed above.

Alternating current cables prepared according to the present disclosure can be low voltage, medium voltage, high voltage, or extra-high voltage cables. Further, direct current cables prepared according to the present disclosure include high or extra-high voltage cables.

Test Methods

Density

Density is determined according to ASTM D792, Method B in isopropanol. Specimens are measured in an isopropanol bath at 23° C. for 8 minutes to achieve thermal equilibrium prior to measurement.

Melt Index

Melt index, or $I_2$, is measured in accordance with ASTM D1238, condition 190° C./2.16 kg, and is reported in grams eluted per 10 minutes.

Molecular Weight Distribution

A high-temperature gel permeation chromatography ("GPC") system is employed, equipped with Robotic Assistant Deliver ("RAD") system for sample preparation and sample injection. The concentration detector is an Infra-red detector (IR4) from Polymer Char Inc. (Valencia, Spain). Data collection is performed using Polymer Char DM 100

Data acquisition box. The carrier solvent is 1,2,4-trichlorobenzene ("TCB"). The system is equipped with an on-line solvent degas device from Agilent. The column compartment is operated at 150° C. The columns are four Mixed A LS 30-cm, 20-micron columns. The solvent is nitrogen-purged TCB containing approximately 200 ppm 2,6-di-t-butyl-4-methylphenol ("BHT"). The flow rate is 1.0 mL/min, and the injection volume is 200 µl. A 2 mg/mL sample concentration is prepared by dissolving the sample in nitrogen-purged and preheated TCB (containing 200 ppm BHT) for 2.5 hours at 160° C. with gentle agitation.

The GPC column set is calibrated by running twenty narrow molecular weight distribution polystyrene ("PS") standards. The molecular weight ("MW") of the standards ranges from 580 to 8,400,000 g/mol, and the standards are contained in six "cocktail" mixtures. Each standard mixture has at least a decade of separation between individual molecular weights. The equivalent polypropylene ("PP") molecular weights of each PS standard are calculated by using the following equation, with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N. Y. Hellman, P. M. Muglia, Macromolecules, 4, 507 (1971)):

$$M_{PP} = \left(\frac{K_{PS} M_{ps}^{a_{ps}+1}}{K_{PP}}\right)^{\frac{1}{a_{pp}+1}}, \quad (1)$$

where $M_{pp}$ is PP equivalent MW, $M_{PS}$ is PS equivalent MW, log K and a values of Mark-Houwink coefficients for PP and PS are listed below.

| Polymer | A | log K |
|---|---|---|
| Polypropylene | 0.725 | −3.721 |
| Polystyrene | 0.702 | −3.900 |

A logarithmic molecular weight calibration is generated using a fourth order polynomial fit as a function of elution volume. Number average and weight average molecular weights are calculated according to the following equations:

$$Mn = \frac{\sum_i Wf_i}{\sum_i \left(\frac{Wf_i}{M_i}\right)}, \quad (2)$$

$$Mw = \frac{\sum_i (Wf_i * M_i)}{\sum_i Wf_i}, \quad (3)$$

where $Wf_i$ and $M_i$ are the weight fraction and molecular weight of elution component i, respectively.

Extrusion Evaluation

Extrusion evaluation of the polymers (including ethylene-based interpolymers alone or HP LDPE alone) is conducted on a 2.5-inch 24:1 L/D extruder using a Maddock screw and 20/40/60/20 mesh screens (at set temperatures of 115.6° C. across all five zones, head and the die). The screw speeds range from 25 rpm to 100 rpm. Melt discharge temperature is measured by immersing the probe of a hand-held thermocouple (pyrometer) in the molten polymer as it exits the die. This parameter is a measure of the extent of shear-heating prevalent.

Shear Viscosity

To determine the melt-flow properties of polymers and the blends of ethylene-based interpolymers with HP LDPE, dynamic oscillatory shear measurements are conducted over a range of 0.1 rad s$^{-1}$ to 100 rad s$^{-1}$ at a temperature of 135° C. or 190° C. and 10% strain with stainless steel parallel plates of 25-mm diameter on the strain-controlled rheometer ARES/ARES-G2 by TA Instruments. V0.1 and V100 are the viscosities at 0.1 and 100 rad s$^{-1}$, respectively, with V0.1/V100 being a measure of shear thinning characteristics.

To determine the melt-flow properties of the full crosslinkable polymeric compositions (including peroxide-containing compositions), dynamic oscillatory shear measurements are conducted over a range of 0.1 rad s$^{-1}$ to 100 rad s$^{-1}$ using a TA Instruments Advanced Rheometric Expansion System at a temperature of 135° C. and 0.25% strain. V0.1 and V100 are the viscosities at 0.1 and 100 rad s$^{-1}$, respectively, with V0.1/V100 being a measure of shear thinning characteristics.

Extensional Viscosity

To determine the melt-extensional properties of the polymers, the blends of ethylene-based interpolymers with HP LDPE, and the full crosslinkable polymeric compositions (including peroxide-containing compositions), extensional viscosity is measured using an ARES FCU Rheometer with Extensional Viscosity Fixture Geometry and TA Orchestrator software. The test is conducted at a rate of 1/sec at 135° C. to simulate extrusion conditions. The maximum ("peak") value of viscosity attained is reported, as well as the viscosity at Hencky Strain of 1 and the maximum Hencky strain.

Zero Shear Viscosity

Zero shear viscosity is measured from creep recovery (SR-200, 25.0 Pa/3 minutes creep/15 minutes recovery/135° C.) on polymers, blends of ethylene-based interpolymers with HP LDPE, or full crosslinkable polymeric compositions (including peroxide-containing compositions).

Moving Die Rheometer

Moving Die Rheometer ("MDR") analyses are performed on the compounds using Alpha Technologies Rheometer MDR model 2000 unit. Testing is based on ASTM procedure D5289. The MDR analyses are performed using 6 grams of material. Samples are tested at 182° C. or at 140° C. at 0.5 degrees arc oscillation for both temperature conditions. Samples are tested on material directly from the Brabender mixing bowl. Resistance to premature crosslinking at extrusion conditions ("scorch") is assessed by ts1 (time for 1 lb-in increase in torque) at 140° C. Ultimate degree of crosslinking is reflected by MH (maximum elastic torque)–ML (minimum elastic torque) at 182° C.

Gel Content

Gel content (insoluble fraction) is determined by extracting with decahydronaphthalene (decalin) according to ASTM D2765. The test is conducted on specimens resulting from MDR experiments at 182° C. A WILEY mill is used (20-mesh screen) to prepare powdered samples, at least one gram of material for each sample. Fabrication of the sample pouches is crafted carefully to avoid leaks of the powdered samples from the pouch. In any technique used, losses of powder to leaks around the folds or through staple holes are to be avoided. The width of the finished pouch is no more than three quarters of an inch, and the length is no more than two inches. 120 mesh screens are used for pouches. The sample pouch is weighed on an analytical balance. 0.3 grams (+/−0.02 g) of powdered samples is placed into the pouch. Since it is necessary to pack the sample into the pouch, care is given not to force open the folds in the pouch. The pouches are sealed and samples are then weighed. Samples are then placed into one liter of boiling decahydronaphthalene (decalin), with 10 grams of 2,2'-methylene-bis (4-methyl-6-tertiary butyl phenol) for 6 hours using flasks in a heated mantle. After the (decalin) has boiled for six hours, the voltage regulator is turned off leaving the cooling water running until (decalin) has cooled below its flash point (this typically takes at least a half hour). When the (decalin) has cooled, the cooling water is turned off and the pouches removed from the flasks. The pouches are allowed to cool under a hood, to remove as much solvent as possible. Then the pouches are placed in a vacuum oven set at 150° C. for four hours, maintaining a vacuum of 25 inches of mercury. The pouches are then taken out of the oven and allowed to cool to room temperature. Weights are recorded on an analytical balance. The calculation for gel extraction is shown below where W1=weight of empty pouch, W2=weight of sample and pouch, W3=weight of sample, pouch and staple, and W4=weight after extraction.

% extracted=$((W3-W4)/(W2-W1))\times 100$

Gel Content=100−% extracted

Hot Creep

Hot creep is determined according to ICEA-T-28-562:2003. Hot creep testing is conducted on 50-mil (1.3-mm) thick samples in an oven with a glass door at 200° C. with 0.2 MPa stress applied to the bottom of the specimens. Three test specimens for each sample are cut using ASTM D412 type-D tensile bars. The samples are elongated for 15 minutes where the percentage increases in length are measured and the average values of the three specimens are reported.

Dissipation Factor

Dissipation factor ("DF") testing at 60 Hz and 2 kV applied voltage is conducted on crosslinked 50-mil (1.3-mm) plaques. The plaques are degassed in a vacuum oven at 60° C. for five days. DF testing is carried out according to ASTM D150 at 60 Hz on a GUILDLINE High Voltage Capacitance Bridge unit, Model 9920A, with a TETTEX specimen holder and a TETTEX AG Instruments Temperature Control Unit. Samples are tested at 60 Hz and 2 kV applied voltage at temperatures of 25° C., 40° C., 90° C., and 130° C.

AC Breakdown Strength

AC breakdown strength ("ACBD"), also known as AC dielectric strength, is tested with nominal 35-mil (0.9-mm) thick crosslinked plaques on a BRINKMAN AC Dielectric Strength Tester using EXXON Univolt N61 transformer oil. Aged samples are aged in a glass U-tube filled with 0.01 M sodium chloride solution for twenty one days at 6 kV.

Water Tree Length

Water treeing is initiated in crosslinked plaques in accordance with ASTM D6097 and the tree length is measured.

Shore Hardness

Determine Shore A and Shore D hardness at 23° C. according to ASTM D2240 on specimens of 250-mil (6.4-mm) thickness and 51-mm diameter, and record the average of five measurements.

Flexural Modulus, 2% Secant

Flexural modulus (2% secant), in psi, is measured in accordance with ASTM D790. The plaques used for flexural modulus testing are prepared by compression molding. The composition is pressed under light pressure (6,000 psi for 15 minutes), at 130° C., in a Carver press. The press is then opened and closed three times to allow the material to soften and air to escape. The pressure is then increased to 15 tons (30,000 lbs), at which time the press platens are cooled to a temperature less than 50° C. at a rate of 15° C./minute. Five test bars, each 5 in.×0.5 in.×0.125 in., are die cut from the compression molded plaques (10 in.×7 in.×0.120 in.). The test involves flexing the bar to failure with a loading nose moving at 0.05 inches/minute, as the bar sits on two radii that are two inches apart, in accordance with ASTM D790. The data reported herein represents the average flexural modulus of the 5 specimens.

Melt Strength

Melt strength of polymers is measured by Rheotens at 190° C. Melt strength, as used herein, is a maximum tensile force measured on a molten filament of a polymer melt extruded from a capillary rheometer die at a constant shear rate of 33 reciprocal seconds ($sec^{-1}$) while the filament is being stretched by a pair of nip rollers that are accelerating the filament at a rate of 0.24 centimeters per second per second ($cm/sec^2$) from an initial speed of 1 cm/sec. The molten filament is preferably generated by heating 10 grams (g) of a polymer that is packed into a barrel of an Instron capillary rheometer, equilibrating the polymer at 135° C. for five minutes and then extruding the polymer at a piston speed of 2.54 cm/minute (cm/min) through a capillary die with a diameter of 0.21 cm and a length of 4.19 cm. The tensile force is preferably measured with a Goettfert Rheotens located so that the nip rollers are 10 cm directly below a point at which the filament exits the capillary die.

Materials

The following materials are employed in the Examples, below.

POE-1 is an ethylene/1-octene polyolefin elastomer having a melt index ($I_2$) of 2.7 g/10 min., and a density of 0.880 g/cm$^3$, which is prepared by The Dow Chemical Company, Midland, Mich., USA. POE-1 is prepared according to the following procedure under the conditions provided in Table A, below. A continuous solution polymerization is carried out in a computer-controlled, continuous stirred tank reactor ("CSTR"). The 5-liter reactor is hydraulically full and set to operate at steady state conditions. Purified Isopar®E, ethylene, 1-octene, and hydrogen are supplied to the reactor through mass-flow controllers using variable speed diaphragm pumps that control the flow rates and reactor pressure. The desired temperature is maintained and monitored using an internal thermocouple. At the discharge of the pump, a side stream is taken to provide flush flows for the catalyst, cocatalyst, and injection lines and the reactor agitator. A slight excess of cocatalyst is used. These flows are measured by Micro-Motion mass flow meters and controlled by control valves or by the manual adjustment of needle valves. The remaining solvent is combined with 1-octene, ethylene, and hydrogen and fed to the reactor. A mass flow controller is used to deliver hydrogen to the reactor as needed. The temperature of the solvent/monomer solution is controlled by use of a heat exchanger before entering the reactor. The catalyst is fed to the reactor separately from the cocatalyst. The component solutions are metered using pumps and mass flow meters and are combined with the catalyst flush solvent and introduced into the bottom of the reactor. The reactor is run liquid-full at 410 psig (2.82 MPa) with vigorous stirring. Product is removed through exit lines at the top of the reactor. Polymerization is stopped by the addition of a small amount of water into the exit line along with any stabilizers or other additives. Solvent is then removed and the product is recovered using a devolatilizing extruder and water-cooled pelletizer.

TABLE A

Reactor Process Conditions for Preparing POE-1

| Parameter | Unit | POE-1 |
|---|---|---|
| Solvent | lb/hr | 687 |
| Ethylene | lb/hr | 138 |
| Hydrogen | g/hr | 5.2 |
| 1-Octene | lb/hr | 70 |
| Feed Temperature | ° C. | 23.9 |
| Reactor Temperature | ° C. | 149 |
| Catalyst Type | | Catalyst |
| Catalyst Concentration | Wt % | 3 |
| Catalyst Flow | g/hr | 6.5 |
| Catalyst Efficiency | kg/mg | 3.34 |
| Cocatalyst Concentration | Wt % | 15 |
| Cocatalyst Flow | g/hr | 5.0 |
| Ethylene Conversion | % | 86.3 |
| Ethylene | g/l | 16.1 |
| Log Viscosity | cP | 2.74 |

POE-2 is an ethylene/1-octene polyolefin elastomer having a melt index ($I_2$) of 4.2 g/10 min., and a density of 0.874 g/cm$^3$, which is prepared by The Dow Chemical Company, Midland, Mich., USA. POE-2 is prepared according to the preparation method described above for POE-1 using the conditions provided in Table B, below.

TABLE B

Reactor Process Conditions for Preparing POE-2

| Parameter | Unit | POE-2 |
|---|---|---|
| Solvent | lb/hr | 818 |
| Ethylene | lb/hr | 146 |
| Hydrogen | Std cc/min | 2655 |
| 1-Octene | lb/hr | 79.5 |
| Feed Temperature | ° C. | 30 |
| Reactor Temperature | ° C. | 155 |
| Catalyst Type | | Catalyst |
| Catalyst Concentration | ppm | 100 |
| Catalyst Flow | lb/hr | 1.03 |
| Catalyst Efficiency | kg/mg | 2.0 |
| Cocatalyst Concentration | ppm | 1177 |
| Cocatalyst Flow | lb/hr | 0.52 |
| Ethylene Conversion | % | 82.7 |
| Ethylene | g/l | 16.7 |
| Log Viscosity | cPa | 2.14 |

NORDEL™ IP 3722 EL is a hydrocarbon rubber (EPDM) having a density of 0.87 g/cm$^3$, a Mooney viscosity at 125° C. of 18 MU, an ethylene content of 70.5 wt %, and an ethylidene norbornene content of 0.5 wt %, which is commercially available from The Dow Chemical Company, Midland, Mich., USA.

LDPE-1 is a high-pressure low-density polyethylene (HP LDPE) having a nominal density of 0.919 g/cm$^3$ and a nominal melt index ($I_2$) of 0.5 g/10 min., which is available from The Dow Chemical Company, Midland, Mich., USA.

LDPE-2 is a high-pressure low-density polyethylene (HP LDPE) having a nominal density of 0.922 g/cm$^3$ and a nominal melt index ($I_2$) of 1.8 g/10 min., which is available from The Dow Chemical Company, Midland, Mich., USA.

ENGAGE™ 7270 is an ethylene/1-butene polyolefin elastomer having a density of 0.881 g/cm$^3$, a melt index ($I_2$) of 0.72 g/10 min., and a Mooney viscosity (ML 1+4 @ 121° C.) of 24 MU, which is commercially available from The Dow Chemical Company, Midland, Mich., USA.

Dicumyl peroxide is commercially available under the trade name PERKADOX™ BC-FF from AkzoNobel Polymer Chemicals LLC, Chicago Ill., USA.

The polyethylene glycol is PEG 20000 (Clariant Polyglykol 20000 SRU), which is a polyethylene glycol having a mean molecular weight of 20000 and is commercially available from Clariant Corporation, Charlotte, N.C., USA.

Nofmer MSD, also known as 2,4-diphenyl-4-methyl-1-pentene or α-methyl styrene dimer ("AMSD"), is commercially available from NOF Corporation, Tokyo, Japan.

LOWINOX™ TBM-6 is an antioxidant having the chemical name 4,4'-thiobis(2-t-butyl-5-methylphenol), and is commercially available from Addivant Corporation, Danbury, Conn., USA.

SABO™ STAB UV 119 is a high-molecular-weight hindered-amine light stabilizer having as its main component 1,3,5-triazine-2,4,6-triamine, N2,N2"-1,2-ethanediylbis [N2-[3-[[4,6-bis[butyl(1,2,2,6,6-pentamethyl-4-piperidinyl) amino]-1,3,5-triazin-2-yl]amino]propyl]-N',N"-dibutyl-N', N"-bis(1,2,2,6,6-pentamethyl-4-piperidinyl)-, which is commercially available from Sabo S.p.A., Bergamo, Italy.

The catalyst used in preparing POE-1 and POE-2 is bis(2-oxoyl-3-(dibenzo-1H-pyrrole-1-yl)-5-(methyl)phenyl)-(4-(2-methyl)propane-2-yl)-2-phenoxy)-1,3-propanediyl zirconium (IV), which is prepared according to the synthetic procedures of U.S. Published Patent Application No. 2004/0010103 A1.

The cocatalyst used in preparing POE-1 and PEO-2 is modified methylaluminoxane, MMAO-3A solution in heptane, which is commercially available from Akzo Nobel N.V., Amsterdam, Netherlands.

EXAMPLES

Example 1

Prepare five Samples (S1-S5) and four Comparative Samples (CS1-CS4) according to the formulations provided in Table 1, below, and the following process. The lab-scale ("lab") blends are prepared at 170° C. using a Haake Rheomix 3000E mixer with roller style mixing blades at nominal mixing speed of 60 rpm for a period of 5 minutes after all of the formulation components are added to the mixing bowl. Larger quantities of select blends are prepared on a 40-mm 44:1 L/D co-rotating, intermeshing, twin screw extruder (ZSK-40) equipped with an underwater pelletizing system. A screw speed of 240 rpm and barrel temperature of 190° C. are utilized, and the die is at 220° C.

TABLE 1

Polymer Blend Compositions of S1-S5 and CS1-CS4

| | POE-1 (wt %) | POE-2 (wt %) | ENGAGE ™ 7270 (wt %) | LDPE-1 (wt %) |
|---|---|---|---|---|
| S1 (ZSK-40) | 80 | — | — | 20 |
| S2 (lab) | 80 | — | — | 20 |
| S3 (lab) | 70 | — | — | 30 |
| S4 (lab) | — | 70 | — | 30 |
| S5 (ZSK-40) | — | 65 | — | 35 |
| CS1 (lab) | 90 | — | — | 10 |
| CS2 (lab) | — | 90 | — | 10 |
| CS3 (lab) | — | 80 | — | 20 |
| CS4 (lab) | — | — | 92 | 8 |

Analyze S1-S5 and CS1-CS4 along with five additional Comparative Samples (CS5-CS9) according to the procedures provided in the Test Methods section, above. CS5 is neat LDPE-2, CS6 is neat POE-1, CS7 is neat POE-2, CS8 is neat NORDEL™ 3722 EL, and CS9 is neat ENGAGE™ 7270. Results are provided in Table 2, below.

TABLE 2

Properties of S1-S6 and CS1-CS7

|  | Density (g/cm³) | Flexural Modulus, 2% Secant (psi) | $I_2$ (g/10 min) | Melt Strength (cN) @ 190° C. | V0.1/V100 @ 190° C. | V100 (Pa · s) @ 190° C. | V0.1/V100 @ 135° C. | V100 (Pa · s) @ 135° C. | Max. extens. viscosity at 135° C., 1 s$^{-1}$ (Pa · s) | Zero Shear Viscosity at 135° C. (Pa s) |
|---|---|---|---|---|---|---|---|---|---|---|
| S1 | 0.884 | 4,400 | 1.9 | 10.0 | 6.7 | 858.2 | 11.8 | 1719.1 | 347,000 | 20,020 |
| S2 | 0.888 | 4,700 | 1.9 | 8.6 | 5.6 | 916.5 | N/A | N/A | N/A | N/A |
| S3 | 0.891 | 5,900 | 1.6 | 15.1 | 7.4 | 885.5 | N/A | N/A | N/A | N/A |
| S4 | 0.887 | 4,900 | 2.4 | 5.4 | 5.9 | 683.8 | N/A | N/A | N/A | N/A |
| S5 | 0.887 | 5,200 | 2.2 | 11.8 | 8.1 | 659.0 | 13.6 | 1361.6 | 453,000 | 16,270 |
| CS1 | 0.883 | 3,600 | 2.2 | 4.0 | 4.4 | 932.4 | N/A | N/A | N/A | N/A |
| CS2 | 0.883 | 2,400 | 3.3 | 2.0 | 3.5 | 719.3 | N/A | N/A | N/A | N/A |
| CS3 | 0.883 | 3,200 | 3.1 | 2.4 | 4.5 | 691.2 | N/A | N/A | N/A | N/A |
| CS4 | 0.884 | N/A | 0.65 | 5.6 | 9.5 | 1,729 | N/A | N/A | N/A | N/A |
| CS5 | 0.921 | 26,100 | 1.9 | 8.4 | 16.9 | 579 | 38 | 985 | 392,000 | 31,750 |
| CS6 | 0.880 | 2,600 | 2.7 | 1.5 | 3.5 | 963.3 | 7.3 | 2067.5 | 65,000 | N/A |
| CS7 | 0.874 | 1,600 | 4.2 | 0.7 | 2.9 | 724.3 | 5.2 | 1530.3 | 34,000 | N/A |
| CS8 | 0.872 | N/A | 0.70 | 7.0 | 33 | 1,514 | N/A | N/A | N/A | N/A |
| CS9 | 0.881 | N/A | 0.72 | 4.9 | 7.4 | 1,845 | N/A | N/A | N/A | N/A |

The results provided in Table 2 show a significant increase in melt strength and shear thinning ratio (V0.1/V100) when adding a high-pressure LDPE to an ethylene-based interpolymer. However, of the polymer blend compositions and neat polymers, only S1 to S5 exhibit the following desirable combination of properties: V100 of less than 1,300 Pa·s (at 190° C.), V0.1/V100 of at least 5 (at 190° C.), melt strength greater than 4 cN (at 190° C.), and flexural modulus less than 25,000 psi.

Example 2

Evaluate the extrusion characteristics of S1, S5, CS6, and CS8 according to the procedures provided in the Test Methods section, above. The results are provided in Table 3, below.

TABLE 3

Extrusion Characteristics of S1, S5, CS6, and CS8

|  | S1 | S5 | CS6 | CS8 |
|---|---|---|---|---|
| Melt Discharge Temperature During Extrusion (° C.) | | | | |
| @ 25 rpm | 127.8 | 125.6 | 132.2 | 129.4 |
| @ 50 rpm | 152.2 | 145.6 | 153.3 | 157.8 |
| @ 75 rpm | 171.7 | 161.1 | 173.9 | 184.4 |
| @ 100 rpm | 188.9 | 173.9 | 192.2 | 207.8 |
| Extrusion rate (lb/hr) | | | | |
| @ 25 rpm | 48.8 | 46.8 | 50.5 | 49.0 |
| @ 50 rpm | 100.8 | 102.0 | 101.4 | 99.4 |
| @ 75 rpm | 150.6 | 156.6 | 153.6 | 150.0 |
| @ 100 rpm | 204.6 | 204.0 | 207.6 | 201.0 |
| Extrusion Rate at Melt Discharge Temp. of 145° C. (lb/hr) | 86 | 101 | 81 | 77 |

The results in Table 3 show that the HP LDPE blends with ethylene-based interpolymers (S1 and S5) exhibit desirably lower melt temperatures during extrusion at screw speeds up to 100 rpm and relatively greater extrusion rates at a melt discharge temperature of 145° C. Lower melt temperatures are considered in using such polymer compositions to manufacture electrical insulation compounds containing peroxides, so as to avoid premature crosslinking during extrusion of said insulation compounds. Note that a melt discharge temperature of 145° C. is close to the maximum practiced industrially with compositions containing dicumyl peroxide, in the manufacture of power cables.

It is noteworthy that the measured extrusion rate in lb/hr at melt discharge temperature of 145° C. given in Table 3 ("X") tends to correlate with the measured V100 in Pa·s @ 190° C. given in Table 2 ("Y"), and is described by the following equation, for the assessed compositions:

$Y=12124e^{-0.029X}(R^2=0.8)$; over a "Y" range of 659 to 1541 Pa s $Y=4327.3e^{-0.019X}(R^2=1.0)$; over a "Y" range of 659 to 963 Pa s Example 3

Prepare two additional Samples (S6 and S7) and three additional Comparative Samples (CS10, CS11, and CS12) according to the formulations provided in Table 4, below, and the following procedure. Melt the dicumyl peroxide by heating to 60° C. then mix with the Nofmer MSD at a 5:1 ratio (of peroxide to Nofmer MSD). Prepare a "solids" mixture by mixing everything (except peroxide and Nofmer MSD) in a container by hand. Next, compound the solids mixture in a 250-cm³ Brabender batch mixer with cam rotors at 190° C. and 40 rpm for 5 minutes. The resulting blend is removed from the mixer, cold pressed into a thin sheet, cut into strips, and fed through a pelletizer to make pellets. The polymer pellets are heated in a glass jar at 60° C. for 2 hours and subsequently sprayed with the stipulated amount of peroxide/Nofmer MSD mixture using a syringe. The jar is tumble-blended for 10 minutes at room temperature and heated at 50° C. for 16 hours. Next, the contents of the jar are mixed in a 250-cm³ Brabender mixing bowl with cam rotors at 120° C. and 30 rpm for 10 minutes (after loading).

TABLE 4

Compositions of S6, S7, CS10, CS11, and CS12

|  | S6 | S7 | CS10 | CS11 | CS12 |
|---|---|---|---|---|---|
| Polymer Blend of S1 (wt %) | 96.48 | — | — | — | — |

TABLE 4-continued

Compositions of S6, S7, CS10, CS11, and CS12

| | S6 | S7 | CS10 | CS11 | CS12 |
|---|---|---|---|---|---|
| Polymer Blend of S5 (wt %) | — | 96.48 | — | — | — |
| POE-2 (wt %) | — | — | 97.01 | — | — |
| NORDEL ™ 3722 (wt %) | — | — | — | 97.01 | — |
| LDPE-2 | — | — | — | — | 96.48 |
| Dicumyl Peroxide (wt %) | 2.00 | 2.00 | 1.80 | 1.80 | 2.00 |
| PEG 20000 (wt %) | 0.58 | 0.58 | 0.29 | 0.29 | 0.58 |

TABLE 4-continued

Compositions of S6, S7, CS10, CS11, and CS12

| | S6 | S7 | CS10 | CS11 | CS12 |
|---|---|---|---|---|---|
| LOWINOX ™ TBM-6 (wt %) | 0.34 | 0.34 | 0.34 | 0.34 | 0.34 |
| SABO ™ STAB UV 119 (wt %) | 0.20 | 0.20 | 0.20 | 0.20 | 0.20 |
| Nofmer MSD (wt %) | 0.40 | 0.40 | 0.36 | 0.36 | 0.40 |
| Total: | 100.00 | 100.00 | 100.00 | 100.00 | 100.00 |

Analyze S6, S7, CS10, CS11, and CS12 in a moving die rheometer at 140° C. or 182° C. for evaluation of crosslinking characteristics. For melt rheological measurements, the compositions are compression molded at the following conditions to prevent significant crosslinking: 500 psi (3.5 MPa) at 120° C. for 3 minutes, followed by 2500 psi (17 MPa) at this temperature for 3 minutes, cooling to 30° C. at this pressure, and opening the press to remove the molded plaque. For electrical and mechanical measurements, the compositions are compression molded at the following conditions to make completely crosslinked specimens of different dimensions: 500 psi (3.5 MPa) at 125° C. for 3 minutes, followed by 2500 psi (17 MPa) at 180° C. for 20 minutes, cooling to 30° C. at this pressure, and opening the press to remove the molded plaque. Analyze each of S6, S7, CS10, CS11, and CS12 according to the procedures provided in the Test Methods section, above. Results are provided in Table 5, below.

TABLE 5

Properties of S6, S7, CS10, CS11, and CS12

| | S6 | S7 | CS10 | CS11 | CS12 |
|---|---|---|---|---|---|
| V0.1/V100 (135° C.) | 22.6 | 21.8 | N/A | N/A | 47.7 |
| V100 at 135° C. (Pa · s) | 1,387 | 1,058 | N/A | N/A | 717 |
| Extensional Viscosity at 135° C., 1 s$^{-1}$ and Hencky Strain of 1 (Poise) | 580,180 | 483,380 | N/A | N/A | 557,040 |
| Maximum extensional viscosity at 135° C., 1 s$^{-1}$ (Poise) | 6,371,300 | 3,277,800 | N/A | N/A | 4,001,600 |
| Hencky Strain at Maximum Extensional Viscosity | 4.1 | 3.6 | N/A | N/A | 3.7 |
| Zero Shear Viscosity at 135° C. (Pa · s) | 48,150 | 58,090 | N/A | N/A | 92,300 |
| ts1 at 140° C. (minutes) | 31.1 | 38.8 | 28.5 | 31.6 | 54.7 |
| MH-ML at 182° C. (lb-in.) | 5.1 | 4.1 | 5.7 | 5.2 | 3.1 |
| Gel content (wt %) after crosslinking | 89 | 88 | 97 | 87 | 82 |
| Hot creep at 200° C. (%) after crosslinking | 32 | 37 | 19 | 23 | 39 |
| Dissipation factor at 2 kV, 130° C., 60 Hz (%) after crosslinking | 0.15 | 0.50 | 0.13 | 2.67 | 0.09 |
| Hardness (Shore D) after crosslinking | 30.0 | 30.3 | 26.2 | 24.2 | 46.1 |
| Hardness (Shore A) after crosslinking | 85.6 | 86.6 | 81.9 | 80.8 | 97.2 |
| AC Breakdown Strength - unaged (kV/mm) | 39.4 | 39.6 | 33.6 | 34.3 | 39.7 |
| AC Breakdown Strength - aged (kV/mm) | 37.1 | 37.6 | 31.3 | 31.2 | 41.4 |
| Water Tree Length (mm) | 0.07 | 0.05 | N/A | N/A | 0.20 |

The results provided in Table 5 show insulation compositions in Samples S6 and S7 that have satisfactory melt rheological properties (at a temperature of 135° C., representative of cable extrusion conditions), crosslinking characteristics, electrical properties, water tree length, and hardness.

Example 4

Prepare one additional Sample (S8) and two additional Comparative Samples (CS13-CS14) according to the formulations provided in Table 6, below, and the following process. The lab-scale ("lab") blends are prepared at 170° C. using a Haake Rheomix 3000E mixer with roller style mixing blades at nominal mixing speed of 60 rpm for a period of 5 minutes after all of the formulation components are added to the mixing bowl.

TABLE 6

Compositions of S8, CS13, and CS14

|  | NORDEL 3722 (wt %) | LDPE-1 (wt %) |
|---|---|---|
| S8 (lab) | 70 | 30 |
| CS13 (lab) | 90 | 10 |
| CS14 (lab) | 80 | 20 |

Analyze S8, CS13, and CS14 along with two additional Comparative Samples (CS15 and CS16) according to the procedures provided in the Test Methods section, above. CS15 is neat LDPE-2, and CS16 is neat NORDEL™ 3722 EL. Results are provided in Table 7, below.

TABLE 7

Properties of S8, CS13, CS14, CS15, and CS16

|  | Density (g/cm$^3$) | Flexural Modulus, 2% Secant (psi) | I$_2$ (g/10 min) | Melt Strength (cN) @ 190° C. | V0.1/V100 @ 190° C. | V100 (Pa · s) @ 190° C. |
|---|---|---|---|---|---|---|
| S8 | 0.890 | 4,400 | 0.17 | 16.4 | 34.9 | 1,221 |
| CS13 | 0.881 | 2,600 | 0.16 | 8.6 | 32.7 | 1,368 |
| CS14 | 0.886 | 3,400 | 0.15 | 12.0 | 33.9 | 1,329 |
| CS15 | 0.922 | 28,300 | 1.7 | 8.4 | 21.6 | 614 |
| CS16 | 0.877 | 1,700 | 1.2 | 6.2 | 31.8 | 1,474 |

The results provided in Table 7 demonstrate a significant increase in melt strength and shear thinning ratio (V0.1/V100) when adding a high-pressure LDPE to an ethylene-based interpolymer. However, of the polymer blend compositions and neat polymers, only S8 exhibits the following desirable combination of properties: V100 of less than 1,300 Pa·s (at 190° C.), V0.1/V100 of at least 5 (at 190° C.), melt strength greater than 4 cN (at 190° C.) and flexural modulus less than 25,000 psi.

The invention claimed is:

1. A crosslinkable polymeric composition comprising:
(a) a polymer blend comprising:
(1) 10 to 94 weight percent, based on the total weight of said crosslinkable polymeric composition, of an ethylene-based interpolymer having the following properties:
(i) a density of 0.93 g/cm3 or less,
(ii) a melt index (I2) at 190° C. of greater than 0.2 g/10 minutes, and
(iii) a shear thinning ratio (V0.1/V100) at 190° C. and 10% strain of less than 8; and
(2) 5 to 90 weight percent, based on the total weight of said crosslinkable polymeric composition, of a high-pressure polyethylene; and
(b) 0 to less than 40 weight percent, based on the total weight of said crosslinkable polymeric composition, of a filler,
wherein said ethylene-based interpolymer of component (a) is not prepared in a high-pressure reactor or process,
wherein said polymer blend has the following properties:
(i) a shear thinning ratio (V0.1/V100) at 190° C. and 10% strain of at least 5,
(ii) a high-shear viscosity (V100) at 190° C. and 10% strain of less than 1,300 Pa·s,
(iii) a melt strength of at least 4 centiNewtons at 190° C., and
(iv) a flexural modulus, 2% secant, of less than 25,000 psi.

2. The crosslinkable polymeric composition of claim 1, wherein said polymer blend has a shear thinning ratio (V0.1/V100) at 190° C. and 10% strain of at least 10% greater than the shear thinning ratio of said ethylene-based interpolymer.

3. The crosslinkable polymeric composition of either claim 1, wherein said high-pressure polyethylene is present in an amount ranging from 20 to 35 weight percent based on the total weight of said polymer blend, wherein said polymer blend exhibits a melt strength of at least 5 centiNewtons at 190° C.

4. The crosslinkable polymeric composition of claim 1, wherein said crosslinkable polymeric composition is rendered crosslinkable by further comprising (c) an organic peroxide in an amount of at least 0.5 weight percent based on the total weight of said crosslinkable polymeric composition.

5. The crosslinkable polymeric composition of claim 1, wherein said ethylene-based interpolymer is an ethylene/1-octene copolymer.

6. The crosslinkable polymeric composition of claim 1, wherein said filler is present in an amount greater than 0 weight percent to less than 40 weight percent, wherein said filler is selected from the group consisting of heat-treated clay, surface-treated clay, and organoclay.

7. The crosslinkable polymeric composition of claim 1, wherein said crosslinkable polymeric composition has one or more of the following properties:
(i) a zero shear viscosity at 135° C. of at least 10,000 Pas;
(ii) an extensional viscosity of greater than 200,000 Poise when measured at 135° C., 1 s−1, and a Hencky strain of 1; and
(iii) a ts1 at 140° C. of at least 10 minutes.

8. A crosslinked polymeric composition prepared from the crosslinkable polymeric composition of claim 1.

9. The crosslinked polymeric composition of claim 8, wherein said crosslinked polymeric composition has one or more of the following properties:
(i) an MH-ML at 182° C. of at least 0.2 lb-in.;
(ii) a shore D hardness of 40 or less;
(iii) a shore A hardness of 90 or less;
(iv) a gel content of at least 30%;
(v) a hot creep value of 200% or less; and
(vi) a dissipation factor of less than 8% when measured at 60 Hz, 2 kV, and 130° C.

10. A coated conductor comprising:
(a) a conductor; and
(b) an insulation layer at least partially surrounding said conductor, wherein at least a portion of said insulation layer is formed from at least a portion of said crosslinked polymeric composition of claim 8.

* * * * *